E. Shopbell.
Tire Upsetting.
N° 94,346. Patented Aug. 31, 1869.

United States Patent Office.

ELIAS SHOPBELL, OF ASHLAND, OHIO.

Letters Patent No. 94,346, dated August 31, 1869.

IMPROVED MACHINE FOR UPSETTING TIRE.

The Schedule referred to in these Letters Patent and making part of the same.

*To all whom it may concern:*

Be it known that I, ELIAS SHOPBELL, of Ashland, in the county of Ashland, and State of Ohio, have invented certain new and useful Improvements in a Machine for Upsetting Wagon-Tires; and I do hereby declare that the following is a full and exact description of the same, reference being had to the accompanying drawings, and to the letters of reference marked thereon, in which—

Like letters of reference refer to like parts in the views.

B is a stationary frame, secured to a bed-plate or work-bench.

A is a sliding frame, connected with the stationary frame by means of the slides $g\ g$.

Figure 3:
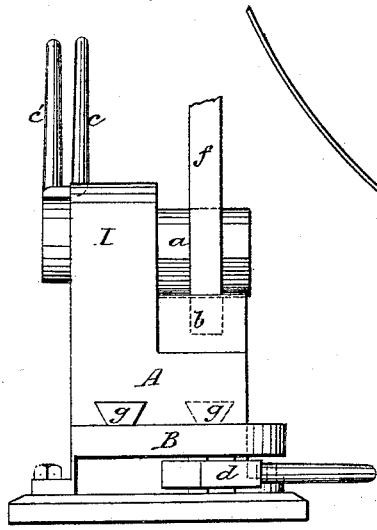
Figure 3 is an end view.
Figure 1:
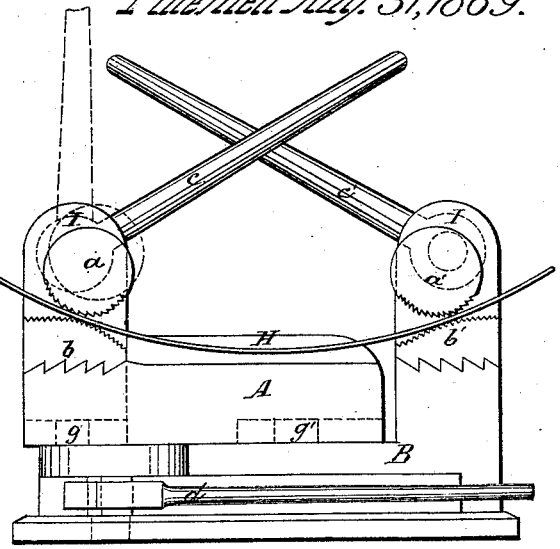
Figure 1 is a side view of the machine.
Figure 4:
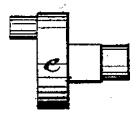
Figure 2:
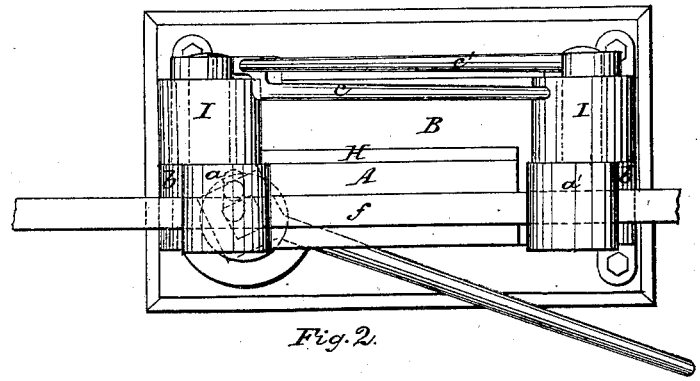
Figure 2 is a top view.

$a\ a$ are serrated eccentric cams, which are connected and revolve on the uprights I I, by means of the handles $c\ c$, as shown in fig. 1.

$e$ is an eccentric, which revolves through a hole in the bed-plate of the stationary frame B. The point enters an oblong hole in the bottom of the sliding frame A, and by turning said eccentric block, by means of the lever $d$, the sliding frame in moved backward or forward.

$b\ b$ are serrated and notched blocks, which are placed under the cams $a\ a$, as shown in fig. 1.

H is a flange, at the back side of the sliding frame A, the object of which is to prevent the tire or iron from bending edgeways while upsetting the same.

The handles $c\ c$ being placed and attached to the revolving cams on the outside of the uprights I I, is to allow space in the event the tire should kink upward, there will then be room to use the hammer without coming too close to the handles.

The object of the eccentric $e$, the manner in which it is located, directly under and in the centre, and having its bearing on the centre of the sliding frame A, is to obviate friction and side-draught, and thereby more purchase is gained.

The blocks $b\ b$ can be moved out or in, to suit the different curves of the tire, or can be taken off, so as to form a straight line on the base, and then the machine can be used with equal facility for upsetting iron axle-trees, spindles, shafting, or any straight pieces of iron, which is a very important item, as it makes the machine doubly valuable.

The manner in which this machine, as constructed, operates in upsetting tire is as follows:

The sliding frame A is moved out from the stationary frame B by movement of the lever $d$, the handles $c\ c$ are turned up, so as to open the space under the cams $a\ a$, which are then ready to receive any-sized tire. The iron is then placed under the cams, the handles are then turned or clamped down, as indicated in fig. 1, which will securely hold it, when the sliding frame A is then moved forward, more or less, by means of the lever $d$, compressing the tire as may be desired.

What I claim, and desire to secure by Letters Patent, as an improvement on a former tire-upsetting machine, secured to me by Letters Patent, dated January 2, 1866, and numbered 51,872, is—

1. The combination of the serrated sliding frame A, stationary serrated frame B, serrated blocks $b\ b'$, and serrated eccentrics $a\ a$, substantially as described.

2. In combination with the above, eccentric lever $d$, substantially as described.

ELIAS SHOPBELL.

Witnesses:
ROBERT McMURRAY,
A. L. CURTIS.